United States Patent [19]

Takahashi et al.

[11] Patent Number: 4,818,995
[45] Date of Patent: Apr. 4, 1989

[54] PARALLEL TRANSMISSION SYSTEM

[75] Inventors: Yoshitaka Takahashi, Tokorozawa; Yasushi Takahashi; Yukio Nakano, both of Hachioji; Akihiro Hori, Yokohama; Minoru Maeda, Tokyo; Yoshihiko Miyano, Fujisawa; Ikuo Tokizawa; Masatoyo Sumida, both of Yokosuka, all of Japan

[73] Assignees: Hitachi Ltd.; Nippon Telegraph and Telephone Corporation, both of Tokyo, Japan

[21] Appl. No.: 51,519

[22] Filed: May 19, 1987

[30] Foreign Application Priority Data

May 19, 1987 [JP] Japan .................................. 61-112631

[51] Int. Cl.⁴ .............................................. H03M 7/00
[52] U.S. Cl. .......................................... 341/94; 341/50

[58] Field of Search ................. 340/347 DD; 370/100, 370/103, 108; 375/106, 111, 117; 341/50, 94

[56] References Cited

U.S. PATENT DOCUMENTS

| 4,520,480 | 5/1985 | Kawai ................................. 370/100 |
| 4,615,040 | 9/1986 | Mojoli et al. ................... 375/111 X |
| 4,691,294 | 9/1987 | Humpleman ................... 370/103 X |

Primary Examiner—William M. Shoop, Jr.
Assistant Examiner—Richard K. Blum
Attorney, Agent, or Firm—Antonelli, Terry & Wands

[57] ABSTRACT

A parallel pulse transmission system, wherein the sending side converts original signals into line coded signals of a block coding type (mBnB line codes, $m/2 \geq \frac{2}{3}$, $n \geq 3$) and transmits them after aligning the timings of the blocks receiving side. The regenerates of the systems transmitted line codes and thereafter, aligns the timings of blocks of the line codes.

9 Claims, 6 Drawing Sheets

50: FRAME PULSE
51: INFORMATION PULSE

PARALLEL TRANSMISSION SYSTEM

BACKGROUND OF THE INVENTION

The present invention relates to a parallel transmission system for transmitting pulses distributed in parallel.

Conventionally, differences in delay times in transmission lines when transmitting pulses in parallel through the lines have been a problem. In order to solve this problem, various systems have been studied. One system is a so-called clock sharing system wherein pulses are regenerated using an average value of phases derived from the timing information obtained from transmission lines (Hitachi Journal Vol. 47, No. 3 (1965), pp. 102 to 113 "Time Division Multiplex PCM Communication System by Pulse Distribution Transmission").

However, as the bit rate becomes high, a difference in delay causes a more adverse effect, resulting in a degradation of waveform margin for pulse regeneration, an increase in bit error rates, or the like.

Such a situation will be described with reference to FIG. 3. In FIG. 3, three pulse trains are simultaneously transmitted from transmitters 21a to 21c over transmission lines 22a to 22c to receivers 23a to 23c. The pulse trains are received at the receivers 23a to 23c at different times because of the presence of different propagation delays in the transmission lines 22a to 22c, as shown in waveforms (a) to (c) in FIG. 3. In such a case, the received pulses are sampled by a clock pulse (d) to align them at a smae pulse regeneration time as shown by a dotted-line. However, this becomes difficult when pulse transmission is performed at higher bit rates.

For waveforms (a') to (c') at a bit rate two times as high as that of the waveforms (a) to (c), i.e., with a pulse width half that of the latter waveforms, it now becomes impossible to share a sampling pulse.

In order to solve the above problem, another method may be used wherein a signal is converted into a CMI (Coded Mark Inversion) code as shown in FIG. 4(a). Coding rule violation (indicated by an arrow in FIG. 4(b)) is applied to each signal at the sending side at the same time. The receiving side detects this coding rule violation to align or make equal the occurrence times of such violation at each signal by using buffer memories. With this method, however, a twofold bandwidth becomes necessary so that the circuit performance or the like may often hinder a high speed transmission and hence degrade signal regeneration.

For avoiding the use of a broad bandwidth, a method of inserting frame pulses 50 at constant intervals as illustrated in FIG. 5 is known. With this method, circuits for discriminating frame pulses 50 and information pulses are required, thus leading to a large size circuit arrangement.

SUMMARY OF THE INVENTION

An object of this invention is to solve the above problems and provide a parallel transmission system which ensures waveform margin for pulse regeneration at higher transmission speed, a high efficiency of bandwidth utilization, and is capable of delay compensation with simple circuitry.

In order to attain the above object, the present invention incorporates a specific characteristic of line codes. A block coding type (mBnB Line Code) is adopted as a line coding type, and the phase of each block is used as a basis for compensation of delay differences in parallel transmission.

Codes of a block coding type are obtained by coding original signals through division into blocks of the same length. This will be explained using a simple example: Original signals are divided into three bit words 100, 111, 101, 000, ... and converted into four bit blocks by adding 1 or 0 after the last bit of each word. In accordance with a bit addition rule, one bit is added such that a difference of the numbers of 0s and 1s becomes smaller in each block. In the above example, the blocks are changed to 1001, 1110, 1010, 0001, ... which are converted from three bit words to four bit blocks and hence called 3B4B codes.

To use the bandwidth effectively, it is necessary that a substantially large m/n (e.g., $m/n \geq \frac{2}{3}$) and long block length (e.g., three bits or more) be used.

DESCRIPTION OF THE PREFERRED EMBODIMENTS

Figure 1:
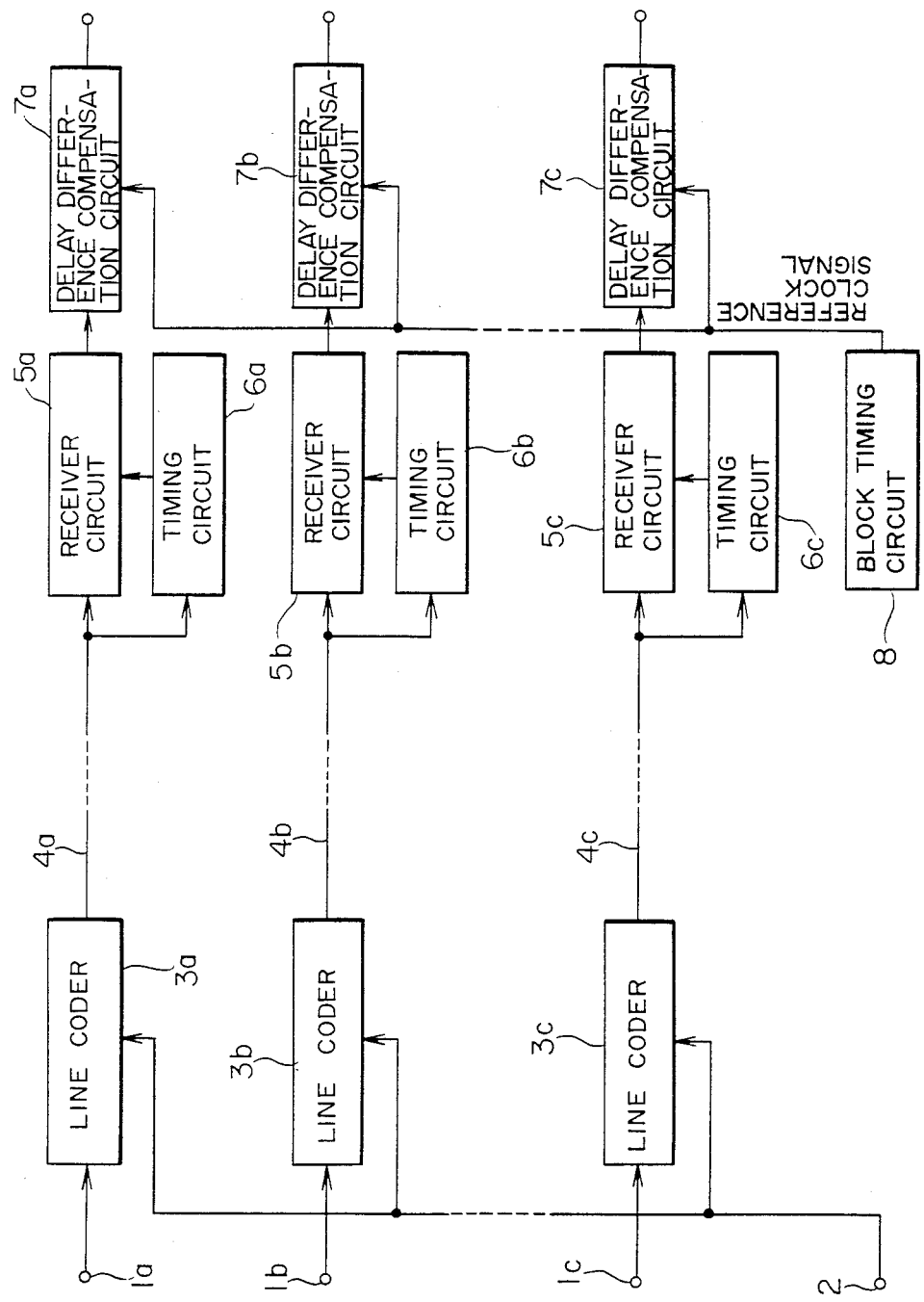
FIG. 1 is a block diagram showing an embodiment of a parallel transmission system according to the present invention.

An embodiment of the present invention will now be described with reference to FIG. 1. In FIG. 1, signals separated in parallel are applied to input terminals 1a to 1c. The signals are converted into block coded line codes at line coders 3a to 3c, in accordance with block timing clocks supplied from an input terminal 2. The converted line codes are delivered to transmission lines 4a to 4c with the phase of each pulse block being made coincident with each other. Typically, the number of pulses of a single block is selected as a number of 3 to 10 considering the efficient use of the bandwidth and the stable delay difference compensation. The line codes are assumed here as 2B3B line codes (2 bit words, 3 bit blocks).

On the receiving side, the block time codes are regenerated by using receiver circuits 5a to 5c and timing circuits 6a to 6c. Since timing signals derived from the transmission lines are used in this operation, degradation of waveform margin for pulse regeneration is small. Differences of delays among outputs of the receiver circuits 5a to 5c occur, as shown by waveforms of FIG. 6(a) to FIG. 6(c).

Figure 6:
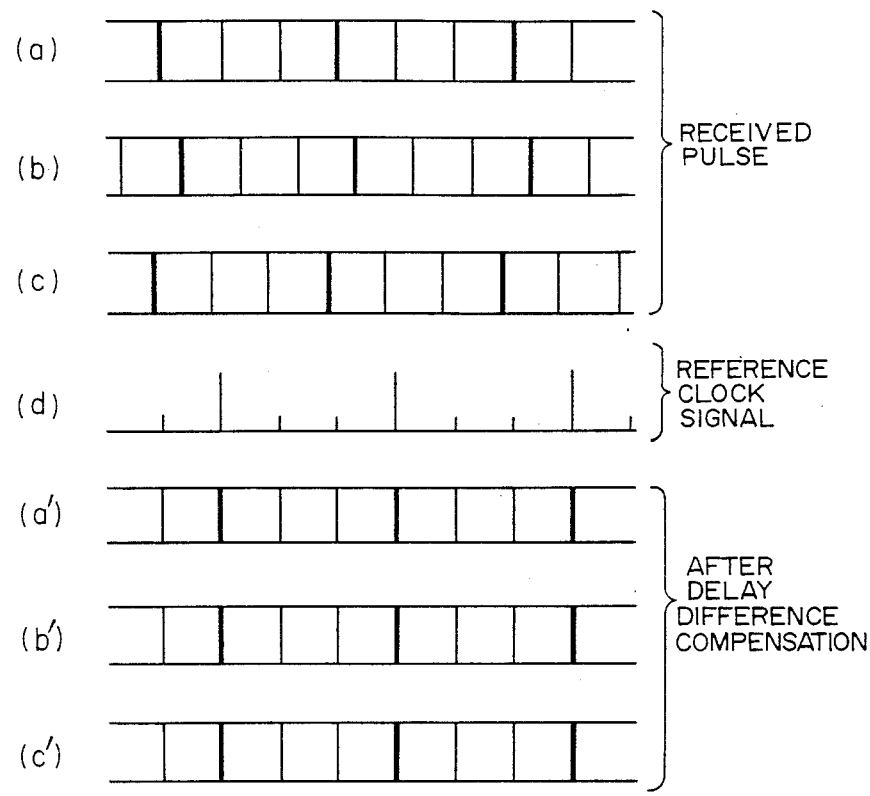
FIG. 6 is a timing chart illustrating the operation of the embodiment shown in FIG. 1.

In order to compensate for the delay difference, each output of the receiver circuit 5a to 5c is temporarily stored in delay difference compensation circuits 7a to 7c and thereafter, the phases of read-out pulse blocks are made equal to each other using a reference clock signal (represented by waveform of FIG. 6(d)) from a block timing circuit 8 (as shown by waveforms of FIG. 6(a') to FIG. 6(c')). After compensating for the delay difference, the block line codes are reconnected into the original signals.

Figure 2:
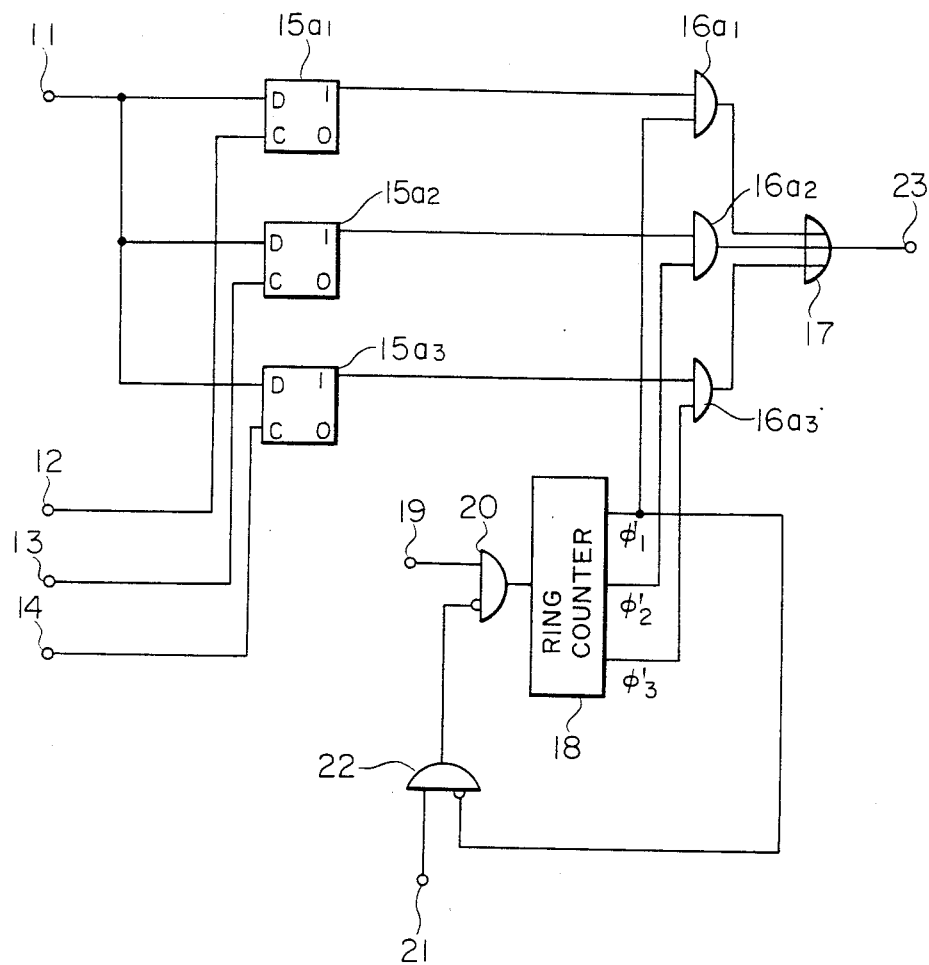
FIG. 2 is a circuit diagram showing the detail of the delay difference compensation circuit shown in FIG. 1.
Figure 3:
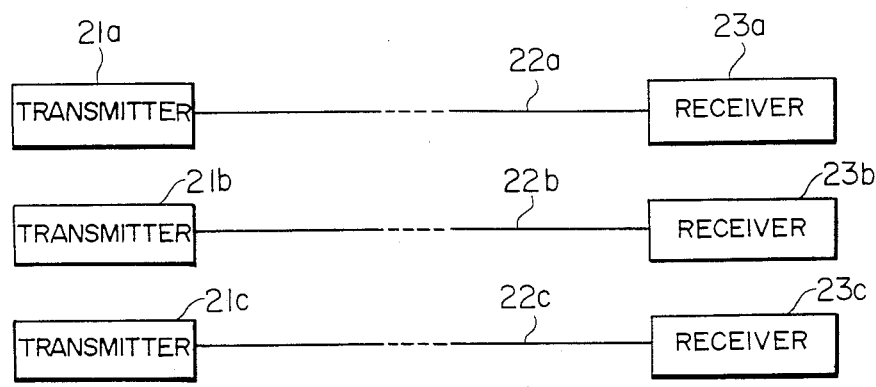
FIG. 3 is a view used for explaining a prior art system.
Figure 3:
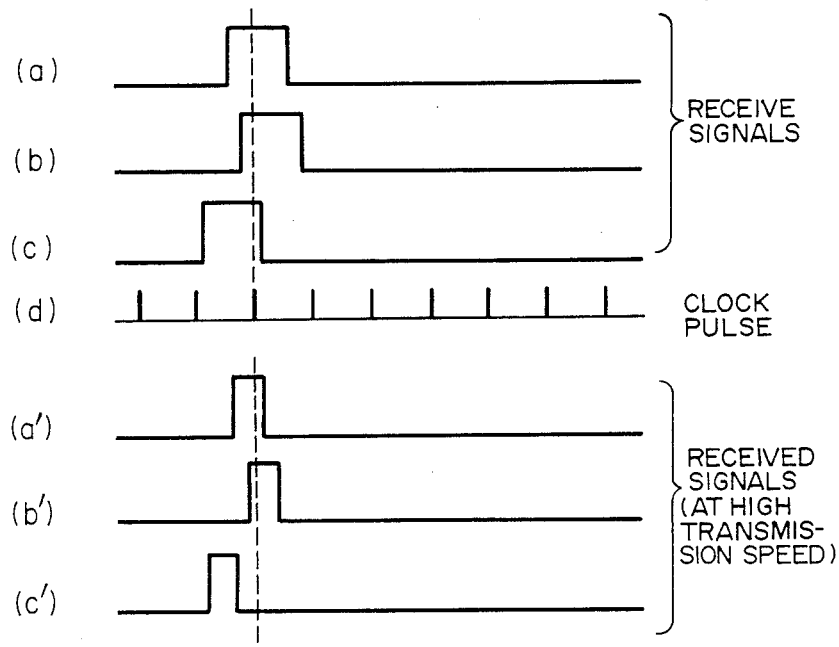
Figure 4:
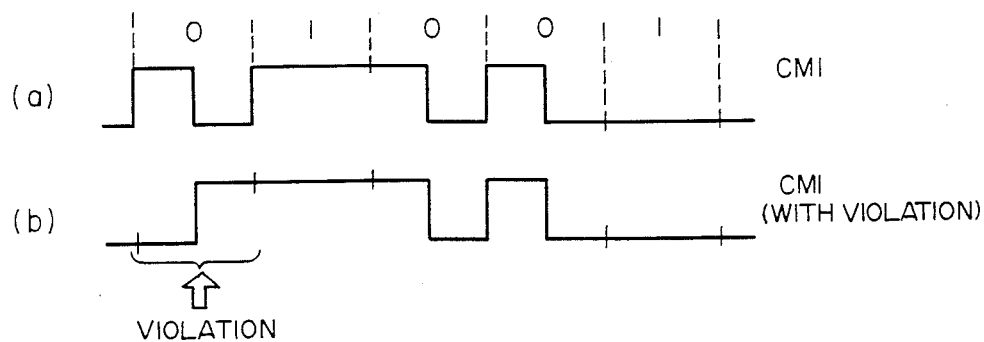
FIG. 4 is a view used for explaining the coding rule of line codes.
Figure 5:
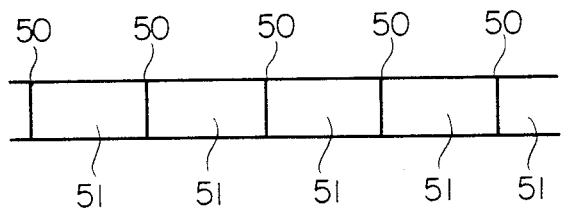
FIG. 5 shows an example of transmission frames.
Figure 7:
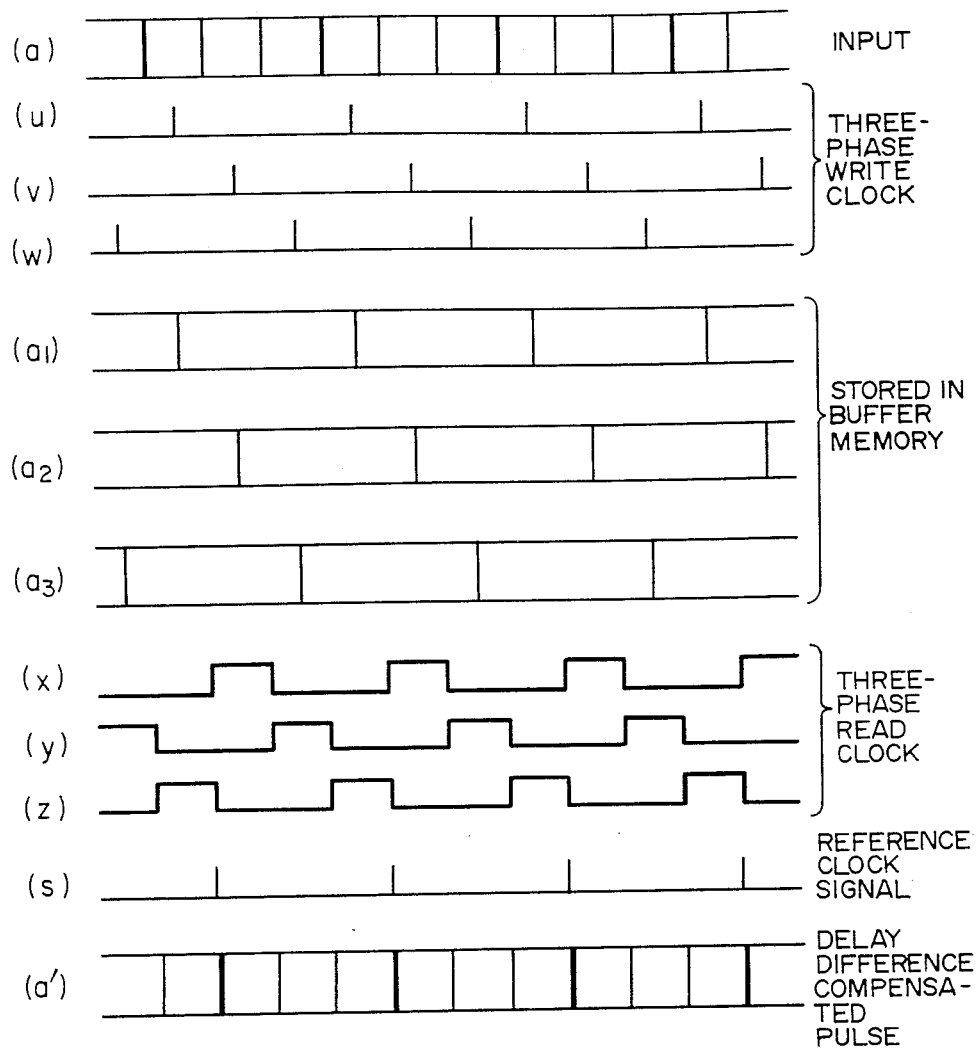
FIG. 7 is a timing chart used for explaining the operation of delay compensation.

The operation of the delay difference compensation circuits 7a–c will be described with reference to FIG. 2. It is assumed that the line codes used in this circuit are 2B3B line codes comprising three bits per one block. A pulse stream (having waveform of FIG. 7(a)) applied to an input terminal 11 is written into buffer memories constructed of flip-flops 15a1 to 15a3 as shown by waveforms of FIGS. 7(a1), 7(a2) and 7(a3), by using three-phase clock pulses (waveforms of FIGS. 7(u), 7(v) and 7(w)) supplied from input terminals 12 to 14. The stored signals are read through gates 16a1 to 16a3 and 17 to result in a delay compensated signal (FIG. 7(a')). Three-phase read pulses (waveforms of FIGS. 7(x), 7(y) and 7(z)) are generated from a ring counter 18 which is driven by pulses applied through a terminal 19 via a gate 20. The pulses applied from the gates 20 through 22 are used for adjusting phases so that the phase of the pulse with the first phase $\phi_1$ coincides with that of the reference clock signal (waveform of FIG. 7(s) outputted form the block timing circuit 8) applied to input terminal 21.

A clock signal for block synchronization which is sent from a sending side via another transmission line or reproduced at the receiving side, may be used as the reference clock signal.

As described above, according to the present invention, degradation of waveform margin for pulse regeneration due to delay difference is not caused even at high speed parallel transmission if a substantially long block length (e.g., 3 to 10 bits) is used. Further, the line code is effectively used for alignment of the phases of pulse blocks with the help of simple block timing circuit, which leads to economical system realization.

We claim:

1. A parallel transmission system comprising:
   a plurality of line coders for converting parallel original signals into parallel mBnB line codes, each code including a series of n-bit blocks, and each block including an m-bit word, where m and n are natural numbers;
   a block timing clock signal for aligning phases of the blocks of said mBnB line codes;
   a plurality of parallel transmission lines for transmitting said parallel mBnB line codes from said line codes wherein each transmission line transmits an mBnB line code;
   a plurality of receiver circuits for receiving said parallel mBnB line codes from said line coders; and
   delay difference compensation means for aligning the phases of the blocks of the parallel mBnB line codes received by said receiver circuits based on a reference signal.

2. A parallel transmission system comprising:
   means for converting parallel original signals into parallel mBnB line codes each code including a series of n-bit blocks, each block including an m-bit word and the phases of the blocks of said mBnB line codes being aligned;
   means connected to said converting means for receiving said parallel mBnB line codes through parallel transmission lines; and
   means for aligning the phases of the blocks of said received parallel mBnB line codes based on a reference signal.

3. A parallel transmission method comprising the steps of:
   converting parallel original signals into parallel mBnB line codes each code including a series of n-bit blocks, and each block including an m-bit word;
   aligning the phases of the blocks of said parallel mBnB line codes;
   transmitting said mBnB line codes with the phases having been aligned with one another;
   receiving each mBnB line code after the transmitting step; and
   aligning the phases of the blocks of the received parallel mBnB line codes based on a reference signal.

4. A parallel transmission method according to claim 3, wherein said reference signal is generated at the receiving side independently.

5. A parallel transmission method according to claim 3, where said reference signal is a clock signal for block synchronization and said reference signal is sent from the sending side via another transmission line.

6. A parallel transmission method according to claim 3, wherein said reference signal is a clock signal for block synchronization generated at the receiving side.

7. A parallel transmission system according to claim 1, wherein n is a natural number where $3 \leq n \leq 10$.

8. A parallel transmission system according to claim 2, wherein n is a natural number where $3 \leq n \leq 10$.

9. A parallel transmission method according to claim 3, wherein n is a natural number where $3 \leq n \leq 10$.

* * * * *